US006457543B1

(12) United States Patent
Wooldridge

(10) Patent No.: US 6,457,543 B1
(45) Date of Patent: Oct. 1, 2002

(54) AIR RECIRCULATION SEAL

(75) Inventor: Scott A. Wooldridge, Fort Wayne, IN (US)

(73) Assignee: International Truck Intellectual Property Company, L.L.C., Warrenville, IL (US)

(*) Notice: Subject to any disclaimer, the term of this patent is extended or adjusted under 35 U.S.C. 154(b) by 0 days.

(21) Appl. No.: 09/707,857

(22) Filed: Nov. 7, 2000

Related U.S. Application Data

(60) Provisional application No. 60/163,985, filed on Nov. 8, 1999.

(51) Int. Cl.[7] .............................. B60K 11/06; E06B 7/22
(52) U.S. Cl. ....................... 180/68.4; 180/68.1; 49/498; 49/492.1
(58) Field of Search ........................... 180/69.2, 69.21, 180/68.1, 68.4; 49/498.1, 492.1, 475.1, 490.1

(56) References Cited

U.S. PATENT DOCUMENTS

| | | | | | |
|---|---|---|---|---|---|
| 4,448,430 A | * | 5/1984 | Bright | .................. | 49/498.1 |
| 4,538,380 A | * | 9/1985 | Colliander | .................. | 49/498.1 |
| 4,542,610 A | * | 9/1985 | Weimar | .................. | 49/498.1 |
| 4,787,668 A | * | 11/1988 | Kawase et al. | .................. | 49/498.1 |
| 4,884,370 A | * | 12/1989 | Nozaki et al. | .................. | 49/498.1 |
| 4,918,867 A | * | 4/1990 | Hayashi et al. | .................. | 49/498.1 |
| 4,949,524 A | * | 8/1990 | Martin et al. | .................. | 49/498.1 |
| 4,959,081 A | * | 9/1990 | Mathellier | .................. | 49/498.1 |
| 4,970,102 A | * | 11/1990 | Guillon | .................. | 49/498.1 |
| 5,001,865 A | * | 3/1991 | Procton | .................. | 49/498.1 |
| 5,095,657 A | * | 3/1992 | Marsh | .................. | 49/498.1 |
| 5,095,658 A | * | 3/1992 | Anderhalden | .................. | 49/498.1 |
| 5,099,612 A | * | 3/1992 | Hayashi et al. | .................. | 49/498.1 |
| 5,258,157 A | * | 11/1993 | Nozaki et al. | .................. | 49/498.1 |
| 5,376,423 A | * | 12/1994 | Wiegand | .................. | 49/498.1 |
| 5,469,667 A | * | 11/1995 | Le Marrec | .................. | 49/498.1 |
| 5,489,461 A | * | 2/1996 | Iwasa et al. | .................. | 49/498.1 |
| 5,511,343 A | * | 4/1996 | Guillon | .................. | 49/498.1 |
| 6,056,075 A | * | 5/2000 | Kargilis | .................. | 180/68.1 |

* cited by examiner

Primary Examiner—Brian L. Johnson
Assistant Examiner—Jeffrey J. Restifo
(74) Attorney, Agent, or Firm—Jeffrey P. Calfa; Neil T. Powell; Dennis Kelly Sullivan

(57) ABSTRACT

A flexible seal with a tree insert on the lower portion of the seal that is pushed without tools into a continuous slot or a series of slots that are spaced along the flat mounting surface. When the seal is mounted adjacent to an edge of a panel or surface, a retaining clip feature can be added along with the tree insert to aid in retaining the seal during the open and close cycle or compression and un-compressed state. There is an upper seal portion engaged to a lower portion. This upper portion is made of a material of a different flexibility than the lower portion. In one embodiment, the lower portion with the tree and the retaining clip, if used, is made of a dense rubber and the upper portion is a cellular sponge. The seal may be used to seal the space between the top of a vehicle radiator module and the hood of the vehicle to thereby prevent recirculation flow around the radiator.

23 Claims, 5 Drawing Sheets

AIR RECIRCULATION SEAL

This is the specification and claims for a non-provisional patent application claiming priority of provisional patent application Ser. No. 60/163,985, filed Nov. 8, 1999.

FIELD OF THE INVENTION

This invention relates generally to seals for motor vehicles. More particularly, this invention relates to the under hood area and for a seal although for multiple tasks, in particular designed to seal the space between an engine cooling system package and the hood of a vehicle.

BACKGROUND OF THE INVENTION

Motor vehicles have engines and these engines are usually provided with cooling from radiators installed in a cooling package. Both the engine and the cooling package are installed under a hood of the vehicle. The hood contains a grille through which a fan of the cooling package draws air. The air passes over the cooling coils of radiator causing heat transfer of energy from the engine coolant system. The top of the cooling package in most cases is spaced below the inner surface of the hood. A flexible seal is generally provided between the top of the cooling package and the hood to prevent the flow of hot air from the air outlet of the radiator to re-circulate back to the air inlet of the radiator. This air recirculation seal has in the past been engaged to the cooling package by use of an adhesive or by separate metal carrier for a retaining clip. The metal carrier was separately engaged to the flexible portion of the seal. The adhesive quality of the tape and secondary process capability is dependent on the preparation and condition of the surface. The overall height is restricted when the seal is run with a metal carrier in the extrusion die.

Drivers of commercial vehicles such as medium and heavy trucks are required to perform pre operational checks on a daily basis. Some of these checks require the opening of the hood. As a result, seals between the hood and cooling package undergo repetitive stress and the connection between the seals and the cooling package become worn out and the seal disengages. This is true for any seal on a closure door that is frequently operated including vehicle doors and other parts of vehicle hoods.

Accordingly, there is a need for an air re-circulation seal for engagement to a cooling package such that such engagement can undergo the repetitive stresses of frequent hood opening. Additionally, there is a need for a seal for other frequently operated closure doors such as to a vehicle passenger compartment doors, vehicle hoods, and automotive trunks that can also undergo similar repetitive stresses.

SUMMARY OF THE INVENTION

As a result a primary object of the invention is to provide an air re-circulation seal for engagement to a vehicle cooling package such the engagement of the seal to the cooling package can undergo the repetitive stresses of frequent hood opening. A secondary object of the invention is to provide a seal for other frequently operated closure doors such as to a vehicle passenger compartment doors, vehicle hoods, and automotive trunks that can also undergo similar repetitive stresses. An additional secondary objective is remove the need for the use of adhesives when engaging vehicle seal. The present invention satisfies the stated objects of invention as well as others not stated. The present invention provides a flexible seal that does not require tape or a metal carrier to be added to the seal. There is a tree insert on the lower portion of the seal that is pushed without tools into a continuous slot or a series of slots that are spaced along the flat mounting surface. When the seal of this invention is mounted adjacent to an edge of a panel or surface, a retaining clip feature can be added along with the tree insert to aid in retaining the seal during the open and close cycle or compression and un-compressed state. There is an upper seal portion engaged to a lower portion. This upper portion is made of a material of a different flexibility than the lower portion. In one embodiment, the lower portion with the tree and the retaining clip, if used, is made of a dense rubber and the upper portion is a cellular sponge.

DRAWINGS

Other objects and advantages of the invention will become more apparent upon perusal of the detailed description thereof and upon inspection of the drawings in which.

DETAILS OF INVENTION

Figure 1:
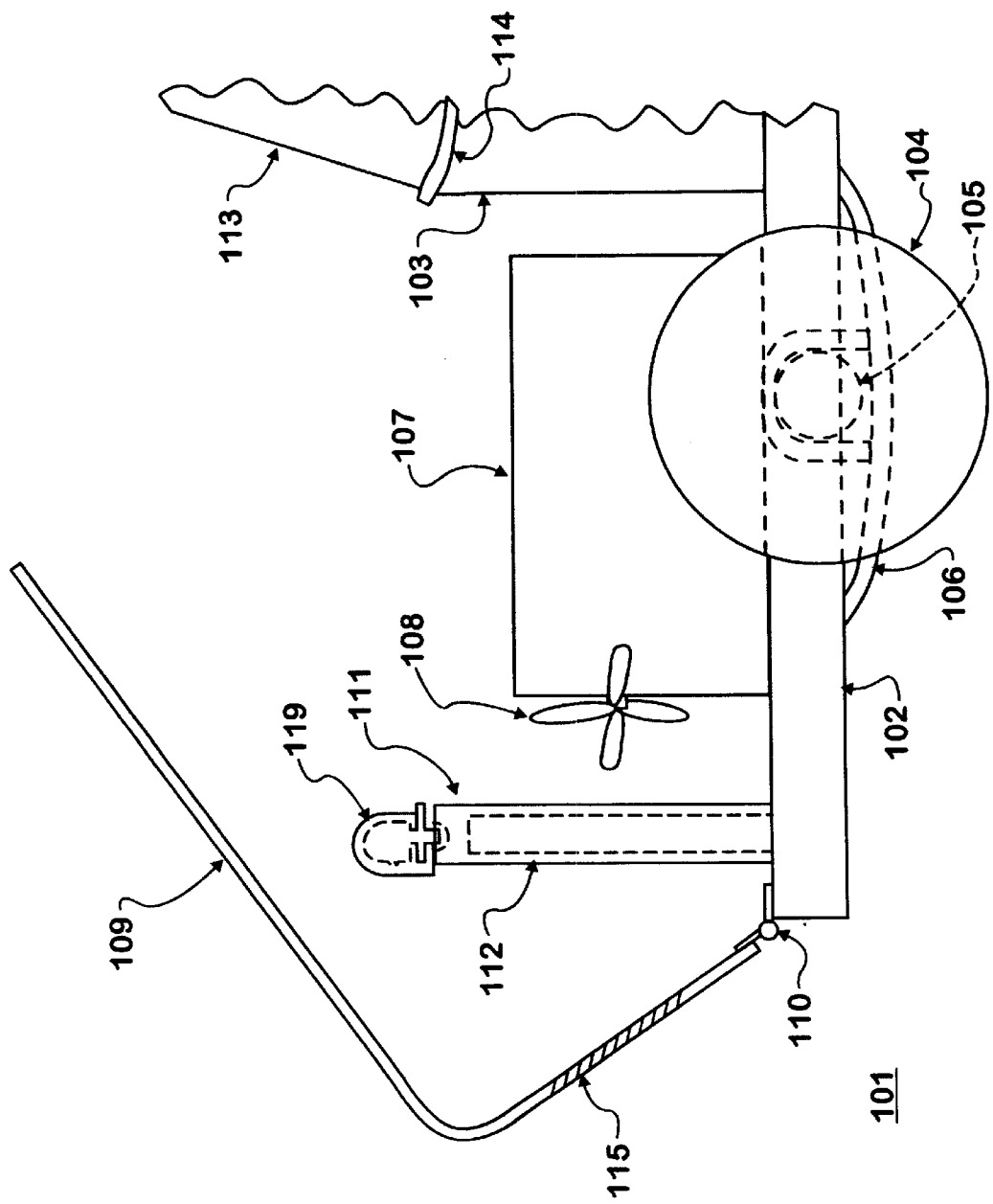
FIG. 1 is a side view and partial cutaway of a front portion of a mobile vehicle with an air recirculation seal in an un-compressed state with the hood open, the seal made in accordance with this invention.
Figure 2:
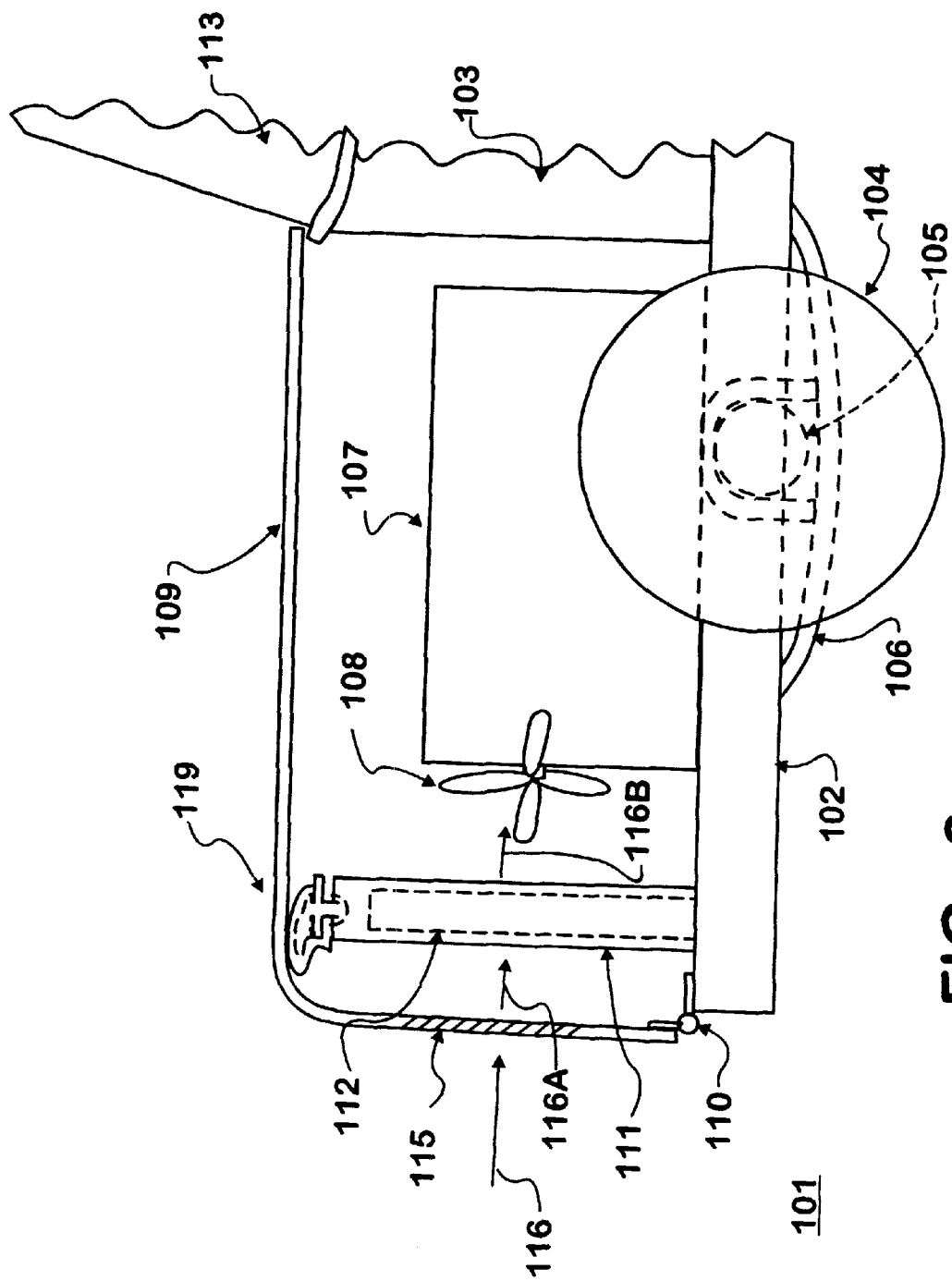
FIG. 2 is the vehicle of FIG. 1 with the seal in a compressed state and the hood closed.

FIGS. 1 and 2 depict a mobile vehicle 101 with an air recirculation seal 119 installed. The air recirculation seat 119 is a seal made in accordance with this invention. The vehicle 101 has a chassis 102. There is a cab 103 for a driver of the vehicle 101 engaged to the chassis 102. The cat 103 has a windshield 113 an a forward portion. The chassis contains wheels 104 on at least two axles 105 engaged to the chassis 102 through a suspension 106. The vehicle 101 has an engine 107 for driving the wheels 105. The engine 107 is engaged to the chassis 102 and has a fan 108 for moving air across a radiator 112 to provide cooling to an engine cooling system. The radiator 112 is engaged to the vehicle 101 through a radiator module or support frame 111. There is a hood 109 for enclosing the engine 107. The hood 109 is pivotably engaged to the vehicle 101 through a hinge device 110 and closes towards the windshield 113. The hood 109 contains an intake grille 115 for air to be drawn from the outside as shown in FIG. 2, the direction of outside air flow designated by reference numeral 116. Upon passing through the grille 115 the radiator inlet air flow, as shown by reference numeral 116A, is drawn across cooling coils of the radiator 112. The air flow is then pulled towards the fan 108 as it is one driver of this motion in addition to vehicle movement, this warmed outlet air flow of the radiator 112 is shown as reference numeral 116B. The air recirculation seal 119 is engaged to an upper portion of the radiator module 111. In the alternative, a seal 219 (shown in FIGS. 6 and 7) may be installed to the radiator module 111. When the hood 109 is closed, the seal is compressed between an inner portion of the hood 109 and the upper portion of the radiator module 111. This prevents the radiator air flow out 116B from recirculating and mixing with the radiator inlet air flow 116A. Such mixing would reduce cooling effect of the radiator 112 as the outlet air flow 116B is warmer than the inlet airflow 116A; such reduced cooling effect impacts engine 107 performance.

Figure 3:
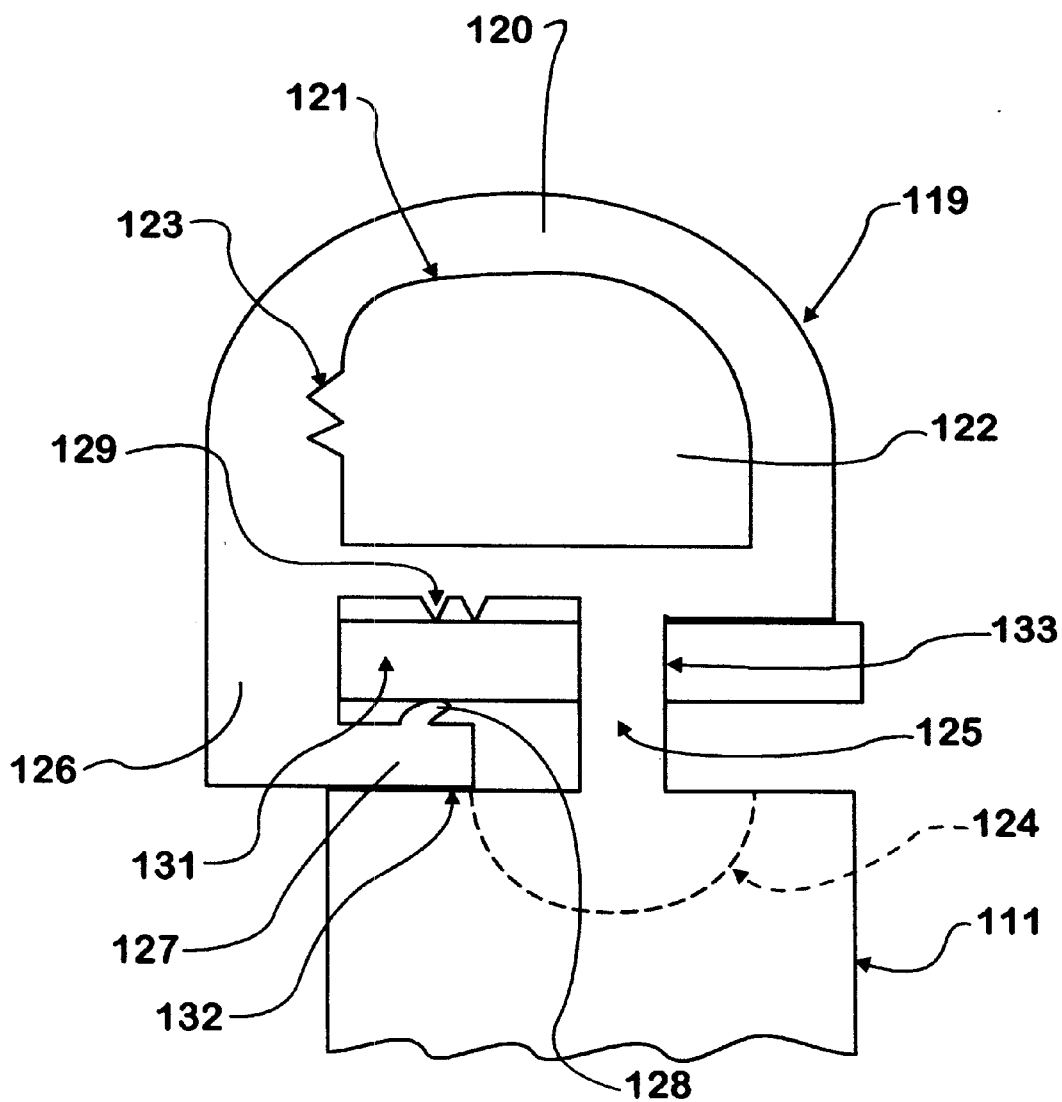
FIG. 3 is an enlarged side view of a seal made in accordance with this invention and installed on a portion of a chassis of the vehicle.
Figure 4:
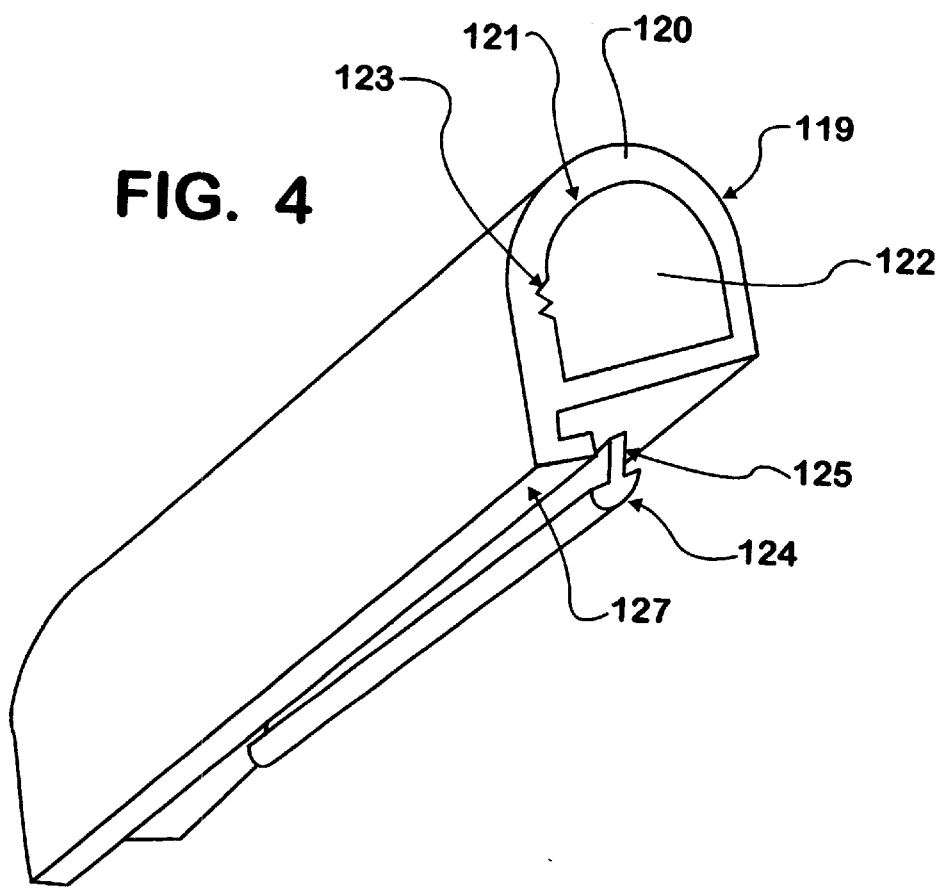
FIG. 4 is a perspective view of one embodiment of this invention.
Figure 5:
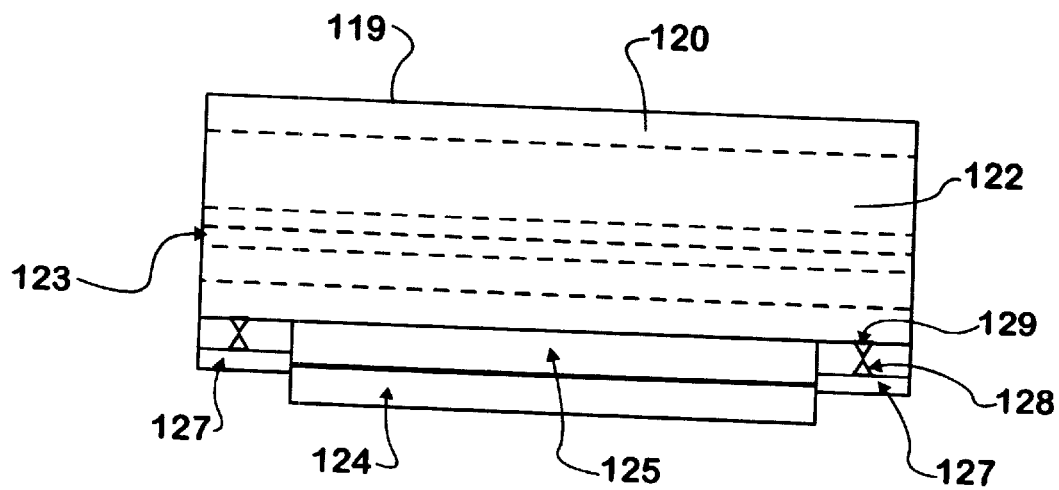
FIG. 5 is a front view of the embodiment shown in FIG. 4.
Figure 6:
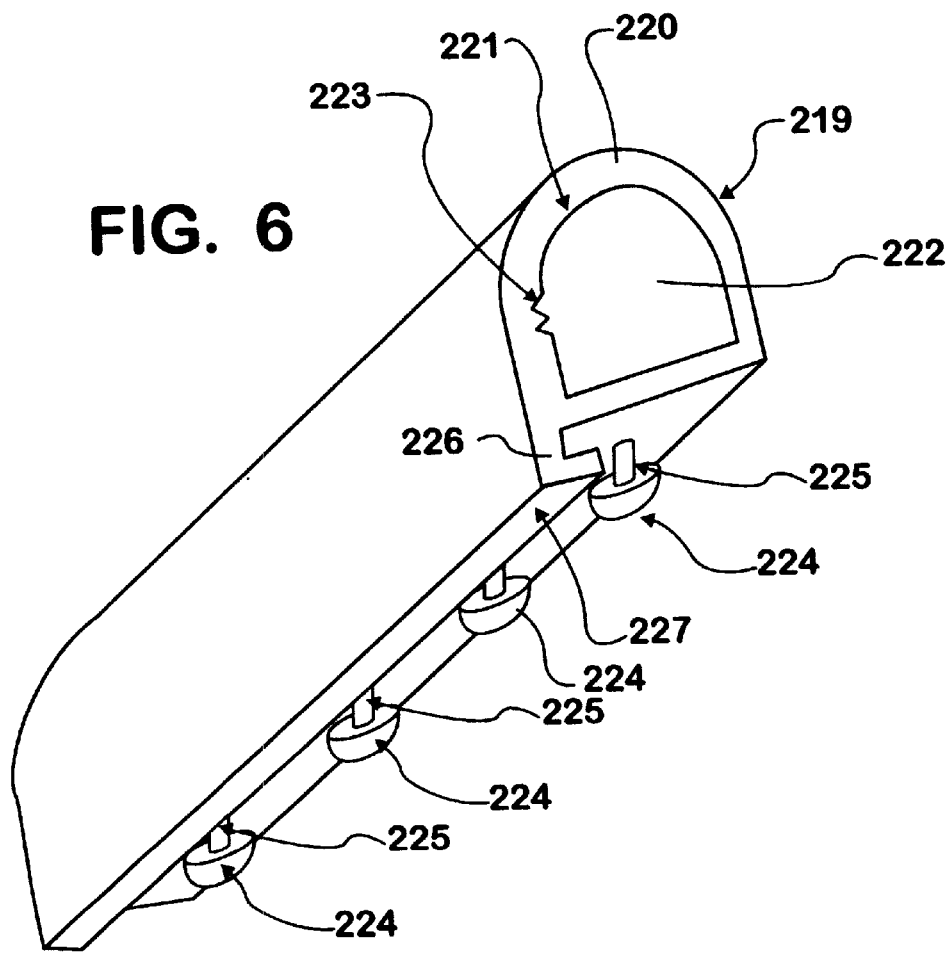
FIG. 6 is a perspective view of an additional embodiment of this invention.
Figure 7:
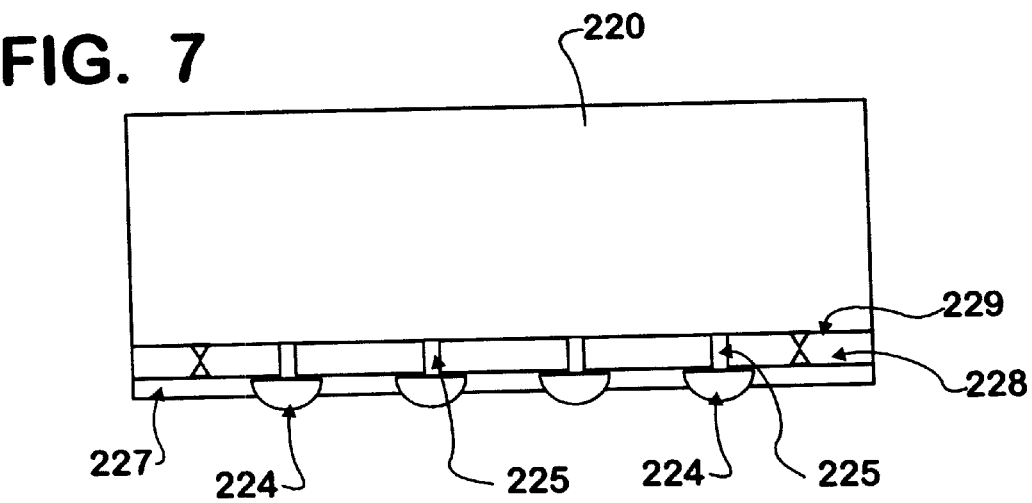
FIG. 7 is a front view of the embodiment shown in FIG. 6.

FIG. 3 is an enlarged side view of a seal made in accordance with this invention and installed on the upper portion of a radiator module. The seal 119 has two main elements. There is an upper or sealing portion 120 and a lower portion. The lower portion has push-through-to-connect feature. The push-through-to-connect feature is pushed though an opening in the component that the seal 119 is to be engaged to and the push-through-to-connect feature expands after insertion. The push-through-to-connect feature than holds the seal 119 to the component to be engaged to. The push-through-to-connect feature or lower portion may be a continuous tree insert 124 as shown in FIGS. 4 and 5 or a mushroom tree insert 224 as shown in FIGS. 6 and 7.

The sealing portion 120 is made of a flexible material while the lower portion is made of a more rigid material to improve its holding. The sealing portion 120 may contain an air filled buffer area 122 defined by the inner walls 121. The inner walls 121 may contain a ridge 123. There may be multiple ridges 123 depending on the desired flexibility and direction of flexing needed for the sealing portion 120. One embodiment includes having the ridge 123 on one side of the sealing portion as shown. For this embodiment, the side of the sealing portion with the ridge 123 tends to collapse when the seal is compressed. The tendency of one side of the sealing portion 120 to collapse improves the overall sealing. In the seal shown in FIG. 2, the ridge 123 is directed to forward portion of the vehicle 101. As the hood 109 is closed and compresses the sealing portion 120 collapses towards the hood hence improving sealing. The gap between the radiator module 111 and the inner portion of the hood 109 is filled. Alternatively, the ridge 123 can at be at different locations along the inner walls 121 of the sealing portion. The ridge 123 is shifted to direct the collapse in a desired direction.

The continuous tree insert 124 is located below the sealing portion 120 in the embodiment shown in FIGS. 4 and 5. The continuous tree insert 124 is engaged to the sealing portion 120 through a continuous stem 125. The seal 119 is engaged to seal a component when the continuous tree insert 124 is inserted into a lengthwise slot 133 in the component. For the vehicle 101, there is a lengthwise slot 133 in an upper ledge 131 of the radiator module 111. The rigidity of the continuous tree insert 124 must be such that the insert may be compressed to fit into the slot 133 but then flex or expand back to its shape to improve the holding power of the insert 124. The continuous tree insert 124 having an outer diameter greater than that of the width of the slot 133. Another variation is to have more than one continuous tree insert 124 and continuous stem 125. There would be additional lengthwise slots 133 for insertion of these continuous tree inserts 124.

The seal 119 may also contain a retaining clip 126 to enhance the holding power of the seal 119 without the need for adhesives. The retaining clip 126 runs along lower side of one edge of the sealing portion 120. The retaining clip 126 has a lower lip 127, this lower lip 127 where used will have lower gripping tongue 128 or tongues 128. These lower gripping tongues 128 are directed outwards from the retaining clip 126 cavity. In this fashion, the retaining clip 126 will be easily slipped over an edge to be gripped or the upper ledge 131 in the case of the radiator module 111. However the lower gripping tongues 128 will inhibit the movement of the retaining clip 126 off of the edge to be gripped or out of engagement with the upper ledge 131. There also may be upper gripping tongues 129 jutting out from the bottom of the sealing portion 120 opposite the lower lip 127 of the retaining clip 126. The choice of which side to put the retaining clip 126 may be the side of the sealing portion 120 where there is tendency to for compressive force on the sealing portion 120 to be off center. In the case of the vehicle 101, the hood 109 tends to compress the seal 119 rearwards towards the cab 103 of the vehicle 101. Without the retaining clip 126, there would be a tendency for the front portion of the seal 119 to disengage from the radiator module 111. The retaining clip 126 is useful where the compressive force is not directly downwards in line with the continuous stem 125 engaged to the continuous tree insert 124.

An additional seal 219, a second embodiment of the invention, is shown in FIGS. 6 and 7. The seal 219 appears similar to seal 119 in a side view such as FIG. 3. The main difference is the use of mushroom tree inserts 224. The mushroom tree inserts 224 are located below the sealing portion 120 in the embodiment shown in FIGS. 6 and 7. Each mushroom tree insert 224 is engaged to a sealing portion 220, similar to sealing portion 120, through a cylindrical stem 225. The seal 219 is engaged to seal a component when each mushroom tree insert 224 is inserted into a cylindrical slot in the component. For the vehicle 101, there are cylindrical slots in an upper ledge 131 of the radiator module 111. The mushroom tree insert 224 having an outer diameter greater than that of the cylindrical slots. This embodiment may also contain a retaining clip 226 similar to the retaining clip 126 shown in FIGS. 4 and 5. The retaining clip 226 will contain a lower lip 227 also for gripping an edge or the upper ledge 131 for the radiator module 111.

The cab 103 may contain a ledge 114 for engagement of a seal made in accordance with this invention. Such a seal would seal the area between a ledge 114 of the vehicle and the hood 109. Other uses include door seals for vehicles and also automotive trunk seals. These alternate uses demonstrate the versatility of seals made in accordance with this invention.

While the invention has been described and illustrated, this description is by way of example only. Additional advantages will occur readily to those skilled in the art, who may make changes without departing from the true spirit and scope of the invention. Therefore, the invention is not limited to the specific details, representative devices, and illustrated examples in this description.

I claim:

1. A mobile vehicle in combination with an air recirculation seal, comprising:

(a) a chassis;

(b) an engine engaged to said chassis;

(c) said engine has a fan for moving air across a radiator to provide cooling to an engine cooling system;

(d) said radiator engaged to said chassis through a radiator module;

(e) a pivotable hood for enclosing said engine;

(f) a seal engaged to an upper portion of said radiator module;

(g) said seal having an upper sealing portion and a lower portion;

(h) said lower portion having a push-through-connect feature, wherein said push-through-to-connect feature is pushed though an opening in said radiator module and said push-through-to-connect feature having expanded after insertion;

(i) a retaining clip running along a lower side of one edge of said upper portion;

(j) said retain clip having a lower lip, said lower lip being directed in a direction perpendicular to said push-through-to-connect feature and said lower lip directed in a direction away from a hood pivot point; and (k) said upper portion of said seal for sealing a space between said radiator module and an inner surface of said hood for preventing air flow through said radiator to recirculate to an inlet of said radiator between said radiator module and said hood when said hood is in a pivoted closed position.

2. The mobile vehicle and recirculation seal combination of claim 1, wherein:

(a) said push-through-to-connect feature being a continuous tree insert;

(b) said continuous tree insert being engaged to said upper portion through a continuous stem;

(c) said radiator module having a lengthwise slot in an upper ledge; and (d) said tree insert inserted into said lengthwise slot.

3. The mobile vehicle and recirculation seal combination of claim 2, wherein:

(a) said continuous tree insert being compressible to fit within said slot and expanding to an outer diameter greater than a width of said slot once inserted.

4. The mobile vehicle and recirculation seal combination of claim 3, wherein:

(a) said upper portion being made of a flexible material; and (b) said upper portion having an air filled buffer area defined by inner walls.

5. The mobile vehicle and recirculation seal combination of claim 4, wherein:

(a) said inner walls having a ridge on one side; and (b) said side of said upper portion with said ridge tending to collapse when said seal is compressed.

6. The mobile vehicle and recirculation seal combination of claim 3, further comprising:

(a) said lower lip having at least one lower gripping tongue; and (b) said lower gripping tongue being directed outwards from a retaining clip cavity.

7. The mobile vehicle and recirculation seal combination of claim 6, further comprising:

(a) upper gripping tongues jutting out from a bottom of said upper portion opposite said lower lip of said retaining clip.

8. The mobile vehicle and recirculation seal combination of claim 7, further comprising:

(a) said upper portion being made of a flexible material; and (b) said upper portion having an air filled buffer area defined by inner walls.

9. The mobile vehicle and recirculation seal combination of claim 8, further comprising:

(a) said inner walls having a ridge on one side; and (b) said side of said upper portion with said ridge tending to collapse when said seal is compressed.

10. The mobile vehicle and recirculation seal combination of claim 1, wherein:

(a) said push-through-to-connect feature is a mushroom tree insert;

(b) said mushroom tree insert being engaged to said upper portion through a cylindrical stem;

(c) said radiator module having a cylindrical slot in an upper ledge; and (d) said tree insert inserted into said cylindrical slot.

11. The mobile vehicle and recirculation seal combination of claim 10, wherein:

(a) said mushroom tree insert being compressible to fit within said cylindrical slot and expanding to an outer diameter greater than a width of said slot once inserted.

12. The mobile vehicle and recirculation seal combination of claim 11, wherein:

(a) said upper portion being made of a flexible material; and (b) said upper portion having an air filled buffer area defined by inner walls.

13. The mobile vehicle and recirculation seal combination of claim 12, wherein:

(a) said inner walls having a ridge on one side; and (b) said side of said upper portion with said ridge tending to collapse when said seal is compressed.

14. The mobile vehicle and recirculation seal combination of claim 11, further comprising:

(a) said lower lip having at least one lower gripping tongue; and (b) said lower gripping tongue being directed outwards from a retaining clip cavity.

15. The mobile vehicle and recirculation seal combination of claim 14, further comprising:

(a) upper gripping tongues jutting out from a bottom of said upper portion opposite said lower lip of said retaining clip.

16. The mobile vehicle and recirculation seal combination of claim 15, further comprising:

(a) said upper portion being made of a flexible material; and (b) said upper portion having an air filled buffer area defined by inner walls.

17. The mobile vehicle and recirculation seal combination of claim 16, further comprising:

(a) said inner walls having a ridge on one side; and (b) said side of said upper portion with said ridge tending to collapse when said seal is compressed.

18. A seal for engagement to a an engagement component with a lengthwise slot, comprising:

(a) an upper sealing portion and a lower portion;

(b) said lower portion having a push-through-to connect feature;

(c) said push-through-to-connect feature being a continuous tree insert;

(d) said continuous tree insert being engaged to said upper portion through a continuous stem;

(e) said continuous tree insert being compressible to fit within the slot in the engagement component;

(f) a retaining clip running along a lower side of one edge of said upper portion;

(g) said retain clip having a lower lip, said lower lip being directed in a direction perpendicular to said continuous tree insert;

(h) said upper portion being made of a flexible material;
(i) said upper portion having an air filled buffer area defined by inner walls;
(j) said inner walls having a ridge on one side; and
(k) said side of said upper portion with said ridge tending to collapse when said seal is compressed.

19. The seal of claim 18, further comprising:
(a) said lower lip having at least one lower gripping tongue; and
(b) said lower gripping tongue being directed outwards from a retaining clip cavity.

20. The seal of claim 19, further comprising:
(a) upper gripping tongues jutting out from a bottom of said upper portion opposite said lower lip of said retaining clip.

21. A seal for engagement to a an engagement component with a cylindrical slot, comprising:
(a) an upper sealing portion and a lower portion;
(b) said lower portion having a push-through-to-connect feature;
(c) said push-through-to-connect feature being a continuous tree insert;
(d) said mushroom tree insert being engaged to said upper portion through a cylindrical stem;
(e) said mushroom tree insert being compressible to fit within the slot in the engagement component;
(f) a retaining clip running along a lower side of one edge of said upper portion;
(g) said retain clip having a lower lip, said lower lip being directed in a direction perpendicular to said mushroom tree insert;
(h) said upper portion being made of a flexible material;
(i) said upper portion having an air filled buffer area defined by inner walls;
(j) said inner walls having a ridge on one side; and
(k) said side of said upper portion with said ridge tending to collapse when said seal is compressed.

22. The seal of claim 21, further comprising:
(a) said lower lip having at least one lower gripping tongue; and
(b) said lower gripping tongue being directed outwards from a retaining clip cavity.

23. The seal of claim 22, further comprising:
(a) upper gripping tongues jutting out from a bottom of said upper portion opposite said lower lip of said retaining clip.

* * * * *